No. 809,996. PATENTED JAN. 16, 1906.
C. P. STEINMETZ.
SYSTEM OF ELECTRICAL DISTRIBUTION.
APPLICATION FILED APR. 13, 1894.
2 SHEETS—SHEET 1.
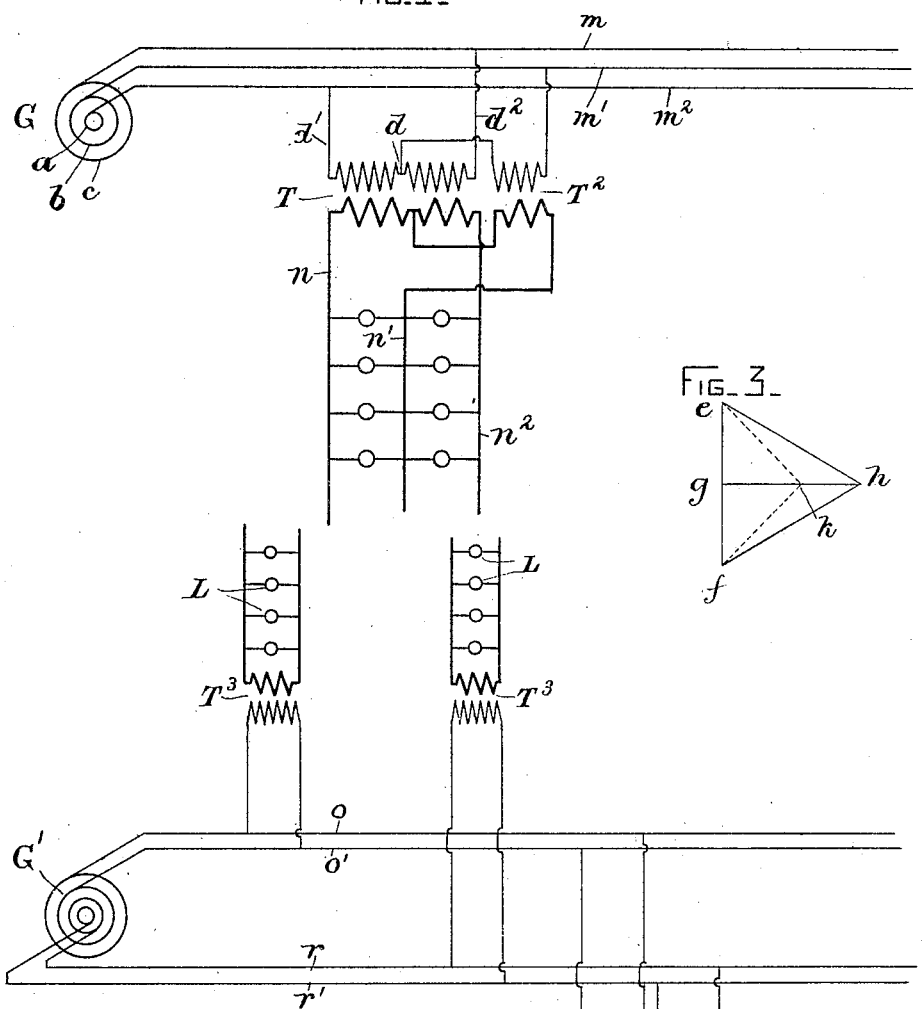
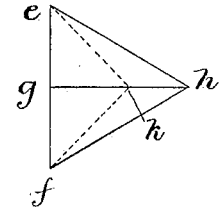
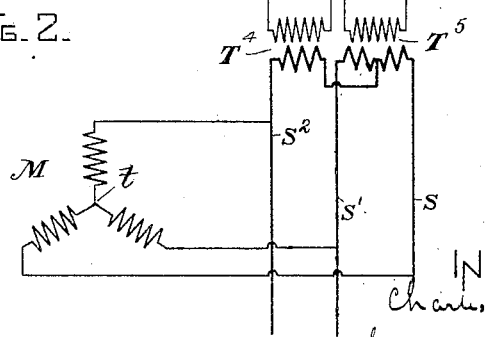
WITNESSES
A. F. Macdonald.
J. L. D. Langdon
INVENTOR
Charles P. Steinmetz
by his attorney

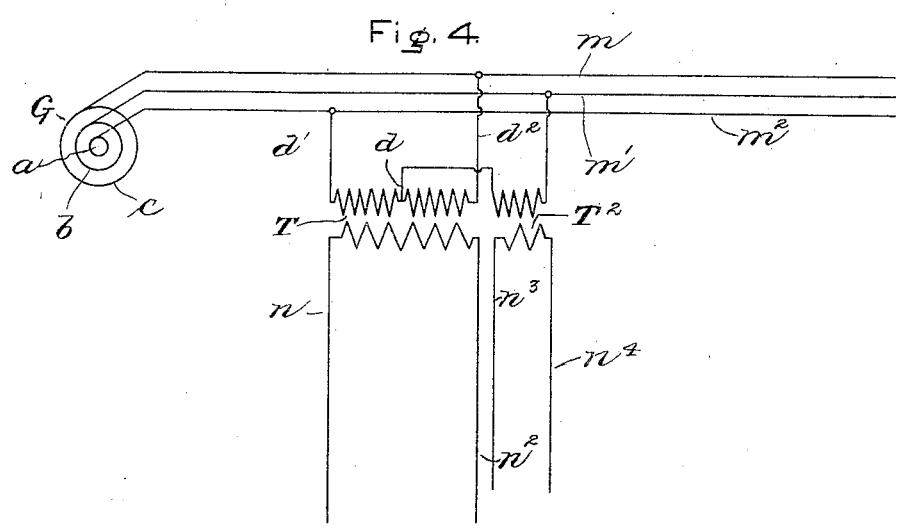

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 809,996.  Specification of Letters Patent.  Patented Jan. 16, 1906.

Application filed April 13, 1894. Serial No. 507,384.

*To all whom it may concern:*

Be it known that I, CHARLES P. STEINMETZ, a subject of the German Emperor, residing at Schenectady, county of Schenectady, State of New York, have invented certain new and useful Improvements in Systems of Electrical Distribution, of which the following is a specification.

The invention hereinafter described relates to a system of electrical distribution for polyphase currents of such nature that three-phase and quarter-phase currents are rendered convertible. In other words, a three-phase system in which the currents are one hundred and twenty degrees apart in phase may be converted into a quarter-phase system in which the currents differ by ninety degrees in phase, or, conversely, quarter-phase currents may be converted into three-phase currents.

In long-distance systems of distribution as herein described three-phase generators are employed, from which the energy is distributed to desired points, where it is converted into quarter-phase currents, which are utilized in the consumption devices. Such a system comprises certain advantages, because three-phase currents are well adapted for economical transmission over considerable areas, while in certain types of apparatus quarter-phase currents are preferable in the consumption devices.

Another advantage of this invention is the possibility of running three-phase and quarter-phase translating devices from a common power-station and systems of distributing-mains. For example, one station may have three-phase motors installed and another quarter-phase motors, yet all can be operated from a common generating plant. It is my intention, therefore, to claim the means and method employed for converting currents of one kind into currents of the other kind, whether it be from three-phase to quarter-phase or from quarter-phase to three-phase currents.

Figure 1 shows in diagram a three-phase generator, distributing-circuits, and means for converting the currents into quarter-phase currents. Fig. 2 shows in a similar manner a system of distribution in which quarter-phase currents are converted into three-phase currents. Fig. 3 is a diagram illustrating geometrically the principle on which the invention is based, and Fig. 4 shows a modification of Fig. 1.

In Fig. 1, G represents a three-phase generator of any ordinary type having three collector-rings $a\ b\ c$, from which brushes lead to three mains $m\ m'\ m^2$, constituting a three-phase interconnected circuit. For converting these currents into quarter-phase currents two transformers $T\ T^2$ are employed, which I will call, respectively, a "main" transformer and "supplementary" transformer in order to readily distinguish one from the other. The terminals $d'\ d^2$ of the primary winding of the main transformer are connected to the mains $m\ m^2$, and the supplementary transformer $T^2$ has one terminal connected to a third main $m'$ and its other terminal to a central point $d$ in the primary winding of transformer T. By "central point" is meant one dividing the electromotive force between the terminals of the transformer into two substantially equal parts, so that the electromotive force between $d$ and $d'$ is substantially equal to that between $d$ and $d^2$. The secondary windings of the transformers are interconnected in a similar manner, the terminals of the main transformer leading to mains $n\ n^2$, while the terminals of the supplementary transformer are coupled to a third main $n'$ and to a central point in the secondary winding of transformer T. With this arrangement currents ninety degrees apart in phase, or "quarter-phase" currents, as they are called, will flow between the mains $n\ n'$ and $n'\ n^2$. It is, however, not essential to interconnect the secondaries of the transformers in all cases, though such an arrangement I regard the best and claim as a specific feature of the improvements herein set forth.

In order to explain the manner in which the change of phase is effected, I refer to the diagram Fig. 3. The electromotive forces maintained between the mains $m\ m'\ m^2$ are displaced in phase by one hundred and twenty degrees and are equal. Let these electromotive forces be represented by the lines $eh$, $ef$, and $fh$, which form an equilateral triangle. By dividing the base-line $ef$ at $g$ into two equal parts and connecting point $g$ with point $h$ two equal right-angle triangles are formed whose bases and altitudes will represent component forces at right angles to one another, into which the forces represented by the lines $eh$ and $fh$ may be resolved. In other words, $eh$ may in this way be resolved into $eg$ and $gh$, $fh$ into $fg$, and $gh$ and the three forces $eh$, $ef$, and $fh$ into $ef$ and $gh$. Comparing this diagram with the connections given the transformers T T$^2$, $ef$ represents the electromotive force between the primary terminals of transformer T, which are coupled directly to two of the mains. $hg$ represents the electromotive force of transformer T$^2$, which is coupled between the third mains and the other two through halves of the main transformer. Hence the three electromotive forces existing between the primary mains and represented by $ef$ $eh$ $fh$ will be resolved into two component electromotive forces ninety degrees apart in phase, with their relative values corresponding to $ef$ $gh$. These component electromotive forces may be separately transformed, if desired, and quarter-phase currents made to flow in independent circuits whose mains are connected in pairs with the secondary windings of the two transformers—as, for example, as shown in Fig. 4—by connecting the mains $n$ $n^2$ to one transformer and the mains $n^3$ $n^4$ to the second transformer. I prefer, however, to employ a quarter-phase interconnected system requiring only three mains. This is accomplished by the arrangement shown in full lines, where the supplementary transformer T$^2$ is interconnected with the main transformer on the secondary as well as the primary side. Were the ratios of transformation the same in the two transformers when so arranged the secondary electromotive forces would have the same relative values as the impressed electromotive forces, and hence would combine, as is evident from the diagram in Fig. 3, to form a three-phase system, though at a changed potential.

In order to change the phase relation as well as the potential, the transformers are wound for different ratios of transformation, so that the secondary electromotive forces will have relative values such as are represented by the lines $ef$ and $gk$ in Fig. 3. These two electromotive forces will then combine to form resultants, which may be represented by the lines $ek$ and $fk$, at an angle of ninety degrees from one another. Hence by resolving the electromotive forces on the three-phase side into components differing in phase by ninety degrees by properly proportioning the values giving these components on the secondary side of the transformers they recombine to give quarter-phase currents in an interconnected circuit requiring only three mains.

In Fig. 2, G' represents conventionally a quarter-phase generator of the ordinary type with its terminals connected to independent circuits, comprising pairs of mains $oo'$ and $rr'$. Lights, as indicated at L, may be supplied with current from these circuits through tension-reducing transformers T$^3$. To convert the quarter-phase currents into three-phase currents, two transformers T$^4$ T$^5$ are used, whose terminals are respectively coupled with the mains $o$ $o'$ and $r$ $r'$. The secondaries of the transformers are interconnected in a manner similar to that already described. The terminals of the secondary winding of transformer T$^5$ lead to mains $s$ $s'$, while one terminal of the secondary of transformer T$^4$ leads to a third main $s^2$ and its other terminal is coupled with the central point of the secondary winding of transformer T$^5$. The electromotive forces on the primary side of the transformers are ninety degrees apart in phase; but on the secondary side the induced electromotive forces combine to form resultant electromotive forces one hundred and twenty degrees apart in phase. In order that this may be the case, the ratios of transformation in the two transformers is made such that the resultant electromotive force generated in the secondary of transformer T$^4$ and the respective halves of transformer T$^5$ are substantially equal to the electromotive force between the terminals of the secondary of T$^5$. These three electromotive forces then will be equal and one hundred and twenty degrees apart in phase, as already explained in connection with the diagram in Fig. 3. The three-phase currents thus secured on the mains $s$ $s'$ $s^2$ may be utilized for operating translating devices of any desired sort and grouped in any well-known manner. There is shown a three-phase motor M, having a Y-winding which has corresponding terminals of the coils connected at $t$, while their free terminals are coupled, respectively, to the mains.

What I claim as new, and desire to secure by Letters Patent of the United States, is—

1. The combination of main and supplementary transformers, interconnected as described, with one terminal of the windings of the supplemental transformer coupled to a central point of the corresponding winding of the main transformer, and wound for such different ratios of transformation that the resultant electromotive forces on one side of the transformer differ by approximately one hundred and twenty degrees in phase, and on the other side by approximately ninety degrees.

2. The combination of a main transformer and a supplementary transformer connected to the main transformer at a point dividing the electromotive force of the main transformer into two substantially equal parts, and so proportioned that the resultant electromotive forces generated in the supplementary transformer and the respective halves of the main transformer are substantially equal to that of the main transformer, as described.

3. The combination with main and supplementary sources of electromotive force differing by substantially ninety degrees in phase, and interconnected with one terminal of the supplementary source coupled to a central point in the main source, and having relative values such that the resultant electromotive forces generated by the supplemental source and the respective halves of the main source are substantially equal to the electromotive force of the main source.

4. The combination in a system of electrical distribution, of a source of three-phase currents differing by substantially one hundred and twenty degrees in phase, with means for converting such currents into quarter-phase currents differing substantially ninety degrees in phase, and translating devices operated by the quarter-phase currents, as set forth.

5. In an apparatus for the transformation of multiphase alternating currents, the combination of two alternating-current transformers, with a connection from one end of one coil of one transformer with approximately the middle point of a coil of the other transformer.

6. An apparatus for transforming multiphase alternating currents in which the different currents bear a symmetrical phase relation to one another into a second system of multiphase alternating currents in which the phases are symmetrically related, which consists of two transformers, one coil or a portion thereof of one transformer being connected to an intermediate point in a coil of the second transformer.

7. In a system of transmitting power by electricity, the combination of means for producing two-phase currents, phase-transforming devices by which said two-phase currents are transformed into three-phase currents, line-circuits extending therefrom to a distance, and means located at said distant point or points by which said three-phase currents are utilized.

8. The combination of windings having an intermediate point of one connected to a terminal of another, means for generating in the active portions of said windings currents differing in phase by substantially ninety degrees, and leads upon which these currents appear combined as three-phase currents.

9. The combination of windings in which electromotive forces are adapted to be generated, and connections between an intermediate point of one winding and the other winding, the voltages of said windings being related to each other as the ratio between a side and altitude of an equilateral triangle.

10. The combination of two alternating-transformer windings, the active voltages of which have approximately the same ratio as that between a side and altitude of an equilateral triangle, connections between the lower voltage winding and the middle point of the other winding, and a system of conductors for conveying three-phase currents connected with the remaining terminals of said windings, and a system of conductors for conveying two-phase currents connected to the other transformer-windings.

11. The combination of two alternating-current transformers, a source of two alternating currents differing in phase ninety degrees, connections therefrom with the primary coils of said transformers, and a connection from one terminal of the secondary coil of one of said transformers with an intermediate point in the secondary of the other transformer.

12. The combination of two windings having one terminal of one of the windings coupled to an intermediate point in the other winding, and means for maintaining in said windings electromotive forces differing in phase from each other by substantially ninety degrees.

13. The combination of two windings, means for generating in each of the windings an electromotive force having a definite phase-angle with respect to the electromotive force generated in the other winding, a connection between one terminal of one of the windings and an intermediate point in the other winding, and leads extending from the free terminals of said windings.

14. The combination of a plurality of transformer-windings, and a connection between the end or approximately the end of one winding and approximately the middle point of another of said windings.

15. The method of electric distribution herein set forth, which consists in generating three-phase currents, transmitting the same to a desired point or points, converting such currents into quarter-phase currents, and utilizing such last-named currents for operating translating devices.

16. The method of electrical distribution, which consists in generating three-phase currents, transmitting the same to a desired point or points by interconnected circuits, converting such currents into quarter-phase currents, and distributing such last-named currents to translating devices by interconnected circuits, as set forth.

17. The method of rendering three-phase and quarter-phase current systems of electrical distribution convertible, which consists in resolving the electromotive forces constituting one such system into component electromotive forces substantially ninety degrees apart in phase, changing the relative value of the components so that when recombined they will form resultant electromotive forces having the desired difference of phase, and recombining such electromotive forces, as described.

18. The method of transmitting electric energy required for operating multiphase apparatus by alternating currents having two phases, which consists in transmitting three-phase alternating currents to a distance, transforming the same into two-phase alternating currents, and utilizing such transformed currents.

19. The method of transmitting electric energy required for operating multiphase apparatus by alternating currents having three phases, which consists in generating two-phase alternating currents, transforming the same into three-phase alternating currents, and transmitting the energy in the form of three-phase currents to a distance and there utilizing the energy thus transmitted.

20. The method of multiphase alternating-current distribution, which consists in generating alternating currents of a given number of phases, transforming the same into alternating currents of a greater number of phases, transmitting the alternating currents thus produced and utilizing the same.

21. The method of transmitting electrical energy to and utilizing the same at a distance, which consists in conveying over lines of conductors three or more alternating currents dephased with reference to each other, from a distant source to, or near the place of consumption, generating there, by the combined inductive action of these currents, two separate alternating magnetic fluxes in quadrature, and generating by the separate inductive influence of these fluxes electric working currents, substantially as described.

22. The method of transmitting electrical energy to and utilizing the same at a distance, which consists in conveying over lines of conductors three or more alternating currents, dephased with reference to each other, from a distant source to, or near the place of consumption, generating there, by the combined inductive action of these currents, two separate alternating magnetic fluxes in quadrature, and generating by the separate inductive influence of these fluxes two-phase alternating working currents, substantially as described.

23. The method which consists in generating alternating currents of a given number of phases, changing the potential of the currents thus generated and at the same time transforming the currents into alternating currents of a greater number of phases.

24. The method which consists in producing two-phase alternating currents, transforming the same into three-phase alternating currents, transmitting the energy in the form of three-phase alternating currents, and utilizing the energy thus transmitted.

25. The hereinbefore-described method of multiphase distribution which consists in generating alternating currents of a given number of phases, changing the potential of the currents thus generated, and at the same time transforming the currents into alternating currents of a greater number of phases and transmitting the latter currents.

26. The method of transmitting power by electricity, which consists in producing two-phase alternating currents, producing thereby alternating magnetomotive forces of different phase, producing by said magnetomotive forces three-phase currents, and utilizing said currents.

27. The method of transmitting power by electricity, which consists in producing alternating currents of a determined number of phases, producing thereby alternating magnetomotive forces of different phase, producing by said magnetomotive forces alternating currents of a relatively greater number of phases, and utilizing said currents.

28. The method of transmitting power by electricity, which consists in producing two-phase alternating currents, producing thereby alternating magnetomotive forces of different phase, producing by said magnetomotive forces three-phase currents whose potential is changed in relation to the primary currents, and utilizing the energy of said three-phase currents.

In witness whereof I have hereunto set my hand this 10th day of April, 1894.

CHARLES P. STEINMETZ.

Witnesses:
B. B. HULL,
C. L. HAYNES.